United States Patent
Ishiyama et al.

(10) Patent No.: US 7,680,949 B2
(45) Date of Patent: Mar. 16, 2010

(54) SOURCE ADDRESS SELECTION SCHEME SUITABLE FOR MULTI-HOME ENVIRONMENT

(75) Inventors: Masahiro Ishiyama, Kanagawa (JP); Tatuya Jinmei, Kanagawa (JP); Yuzo Tamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1264 days.

(21) Appl. No.: 10/401,874

(22) Filed: Mar. 31, 2003

(65) Prior Publication Data

US 2005/0102415 A1  May 12, 2005

(30) Foreign Application Priority Data

Mar. 29, 2002  (JP)  ............... 2002-097652

(51) Int. Cl.
  *G06F 15/16* (2006.01)
(52) U.S. Cl. ..................................... 709/238
(58) Field of Classification Search .............. 709/238, 709/245, 249
  See application file for complete search history.

(56) References Cited

U.S. PATENT DOCUMENTS

| | | | |
|---|---|---|---|
| 6,101,182 A | 8/2000 | Sistanizadeh et al. | |
| 6,981,055 B1* | 12/2005 | Ahuja et al. | 709/238 |
| 2003/0172170 A1* | 9/2003 | Johnson et al. | 709/230 |
| 2003/0204635 A1* | 10/2003 | Ko et al. | 709/250 |
| 2004/0111529 A1* | 6/2004 | Parmar | 709/245 |

FOREIGN PATENT DOCUMENTS

| | | |
|---|---|---|
| EP | 1 089 524 | 4/2001 |
| EP | 1 065 844 | 1/2003 |
| JP | 2000-332813 | 11/2000 |
| WO | WO 00/14919 | 3/2000 |
| WO | WO 01/71982 | 9/2001 |

OTHER PUBLICATIONS

Bates and Rekhter. "Scalable Support for Multi-homed Multi-provider Connectivity." RFC 2260. Jan. 1998.*
Rekhter. "Implications of Various Address Allocation Policies for Internet Routing." RFC 2008. Oct. 1996.*
Request for Comments: 2461; Neighbor Discovery for IP Version 6 (IPv6); Dec. 1998, pp. 1-93.
Request for Comments: 2827;Network Ingress Filtering: Defeating Denial of Service Attacks which employ IP Source Address Spoofing; May 2000, pp. 1-10.

* cited by examiner

*Primary Examiner*—William C Vaughn, Jr.
*Assistant Examiner*—Scott Christensen
(74) *Attorney, Agent, or Firm*—Oblon, Spivak, McClelland, Maier & Neustadt, L.L.P.

(57) ABSTRACT

In a source address selection system containing a router device connected to a plurality of Internet service providers, and a communication node connected to the router device, it becomes possible to utilize the multi-home environment effectively, by enabling the selection of the source address according to the egress router with respect to the Internet, by accounting for the state of connection with the Internet service provider.

19 Claims, 10 Drawing Sheets

| TARGET ADDRESS (RANGE) | preferred-prefix(RECOMMENDED PREFIX) |
|---|---|
| S::a | preferred-prefix1:Pa |
| K::b | preferred-prefix1:Pb, preferred-prefix2: Pc |
| G::/64 | preferred-prefix1:Pc, preferred-prefix2: Pa |
| ............ | ............ |

SOURCE ADDRESS SELECTION SCHEME SUITABLE FOR MULTI-HOME ENVIRONMENT

BACKGROUND OF THE INVENTION

1. Field of the Invention

The present invention relates to a source address selection system, a router device, a communication node and a source address selection method for selecting an egress node appropriately, in the case where the homes, SOHOs, etc., are constantly connected by the Internet through a plurality of ISPs by using IPv6.

2. Description of the Related Art

In recent years, the utilization of the world largest computer network "Internet" has been spreading, and new computer businesses have been developed by accessing the Internet and utilizing disclosed information or services, or by providing information or services to external users who make accesses through the Internet. Also, new technological developments regarding the Internet utilization have been in progress. On the Internet, each computer has an identifier called IP address, and the packet exchanges are carried out according to this IP address. Usually, in the case of accessing the Internet, the user can have an address allocated by making a contract with an ISP (internet Service Provider).

Currently, the IPv6 address is allocated on the provider base. Namely, a partial set of the addresses already allocated to the provider is allocated to the user when the user makes a contract with that provider.

In future, it is expected that even a small scale network such as that of the home or the SOHO will make contracts with a plurality of providers for the purpose of the stable utilization of the Internet or the like. In such a case, there will be a plurality of access points between this network and the Internet, and this situation is referred to as a multi-home.

As shown in FIG. 12, suppose that a node N is connected to the Internet through providers A and B. In the IPv6, the node can have a plurality of addresses, so that in this case, the Node N can use an address allocated by the provider A and an address allocated by the provider B.

Here, in FIG. 12, suppose that a trouble occurs at the provider A such that it became impossible to deliver packets from the Internet to the node N via the provider A.

Even if the node N tries to carry out communication with a server S by using an address belonging to the provider A as a source address, it is impossible to carry out a communication with the server S. This is because even if a packet is transmitted from the node N by using an address belonging to the provider A as a source address, a route to the server S is disconnected due to the trouble occurring at the provider A side.

This can be resolved if it is possible to change a route such that the packet destined to an address belonging to the provider A can reach via the provider B, as done in the current IPv4 protocol. However, such a change of a route can lead to a considerable expansion of the routing table, and its realization is quite difficult in the IPv6 protocol which has a vast address space by using the prior art.

Now, suppose that the packet with an address belonging to the provider A as a source address reaches to the server S via a route of the provider B. In this case, when the packet having an address belonging to the provider A as a source address is received, the server S tries to establish a communication via a route of the provider A in an attempt to carry out a communication with a source node according to this source address. However, the reply packet from the server S cannot reach the node N because the provider A has a trouble, and a communication cannot be carried out. In addition, in the IPv6, an ingress filter (IETF RFC 2267 and RFC 2827) is employed very often, but when it is employed, the packet having an address belonging to the provider A is not allowed to pass through the provider B in the first place, so that the packet will not reach the server S.

In the SOHO or the like, if the multi-home cannot be utilized efficiently due to such a problem, it is difficult to improve the reliability of the Internet.

As described, in the prior art, it has been difficult to utilize the multi-home effectively under the IPv6 environment.

BRIEF SUMMARY OF THE INVENTION

It is therefore an object of the present invention to provide a source address selection system, a router device, a communication node, and a source address selection method capable of utilizing the multi-home environment effectively.

According to one aspect of the present invention there is provided a source address selection system comprising a router device connected to a plurality of Internet service providers, and a communication node connected to the router device, wherein: the router device has: a first checking unit configured to check connectivities with the Internet service providers; a first receiving unit configured to receive a network prefix provided by an Internet service provider for which a connectivity is confirmed by the first checking unit; and a notification unit configured to notify the network prefix received by the first receiving unit; the communication node has: a second receiving unit configured to receive the network prefix from the router device; a generation unit configured to generate a network address according to the network prefix and an identifier unique to the communication node; and a transmission unit configured to transmit a packet by attaching the network address as a source address to a header; and the router device also has: a second checking unit configured to check whether the packet received from the communication node has the source address with the network prefix received from the Internet service provider for which the connectivity is confirmed by the router device or not; and a control unit configured to transfer the packet to the Internet service provider from which the network prefix is received, when the source address has the network prefix received from the Internet service provider for which the connectivity is confirmed by the router device, or notify that a transfer of the packet was not carried out to the communication node without carrying out the transfer of the packet, when the source address does not have the network prefix received from the Internet service provider for which the connectivity is confirmed by the router device.

According to another aspect of the present invention there is provided a router device connected to a plurality of Internet service providers and a local network, for transferring a packet of a communication node connected to the local network, the router device comprising: a first checking unit configured to check connectivities with the Internet service providers; a receiving unit configured to receive a network prefix provided by an Internet service provider for which a connectivity is confirmed by the first checking unit; a notification unit configured to notify the network prefix received by the receiving unit to the local network; a second checking unit configured to check whether the packet received from the communication node has a source address with the network prefix received from the Internet service provider for which the connectivity is confirmed by the router device or not; and a control unit configured to transfer the packet to the Internet service provider from which the network prefix is received, when the source address has the network prefix received from the Internet service provider for which the connectivity is confirmed by the router device, or notify that a transfer of the packet was not carried out to the communication node without carrying out the transfer of the packet, when the source address does not have the network prefix received from the Internet service provider for which the connectivity is confirmed by the router device.

According to another aspect of the present invention there is provided a communication node for carrying out communications with a desired correspondent node through a router device connected to a plurality of Internet service providers, the communication node comprising: a receiving unit configured to receive a network prefix provided by an Internet service provider, from the router device; a generation unit configured to generate a network address according to the network prefix and an identifier unique to the communication node; and a transmission unit configured to transmit a packet by attaching the network address as a source address to a header; wherein the communication node changes the source address of the packet to another network address generated according to a newly notified network prefix and the identifier unique to the communication node and re-transmits the packet, when a notice that the transfer of the packet was not carried out is received from the router device with respect to the packet transmitted by the transmission unit and a notice of the network prefix of the Internet service provider for which the connectivity is confirmed is received.

According to another aspect of the present invention there is provided a source address selection method at a router device connected to a plurality of Internet service providers and a local network, for transferring a packet of a communication node connected to the local network, the source address selection method comprising: checking connectivities with the Internet service providers; receiving a network prefix provided by an Internet service provider for which a connectivity is confirmed; notifying the network prefix received, to the local network; checking whether the packet received from the communication node has a source address with the network prefix received from the Internet service provider for which the connectivity is confirmed by the router device or not; and transferring the packet to the Internet service provider from which the network prefix is received, when the source address has the network prefix received from the Internet service provider for which the connectivity is confirmed by the router device, or notifying that a transfer of the packet was not carried out to the communication node without carrying out the transfer of the packet, when the source address does not have the network prefix received from the Internet service provider for which the connectivity is confirmed by the router device.

According to another aspect of the present invention there is provided a computer program product for causing a computer to function as a router device connected to a plurality of Internet service providers and a local network, for transferring a packet of a communication node connected to the local network, the computer program product comprising: a first computer program code for causing the computer to check connectivities with the Internet service providers; a second computer program code for causing the computer to receive a network prefix provided by an Internet service provider for which a connectivity is confirmed by the first computer program code; a third computer program code for causing the computer to notify the network prefix received by the second computer program code to the local network; a fourth computer program code for causing the computer to check whether the packet received from the communication node has a source address with the network prefix received from the Internet service provider for which the connectivity is confirmed by the router device or not; and a fifth computer program code for causing the computer to transfer the packet to the Internet service provider from which the network prefix is received, when the source address has the network prefix received from the Internet service provider for which the connectivity is confirmed by the router device, or notify that a transfer of the packet was not carried out to the communication node without carrying out the transfer of the packet, when the source address does not have the network prefix received from the Internet service provider for which the connectivity is confirmed by the router device.

According to another aspect of the present invention there is provided a source address selection method at a communication node for carrying out communications with a desired correspondent node through a router device connected to a plurality of Internet service providers, the source address selection method comprising: receiving a network prefix provided by an Internet service provider, from the router device; generating a network address according to the network prefix and an identifier unique to the communication node; transmitting a packet by attaching the network address as a source address to a header; and changing the source address of the packet to another network address generated according to a newly notified network prefix and the identifier unique to the communication node and re-transmitting the packet, when a notice that the transfer of the packet was not carried out is received from the router device with respect to the packet transmitted and a notice of the network prefix of the Internet service provider for which the connectivity is confirmed is received.

According to another aspect of the present invention there is provided a computer program product for causing a computer to function as a communication node for carrying out communications with a desired correspondent node through a router device connected to a plurality of Internet service providers, the computer program product comprising: a first computer program code for causing the computer to receive a network prefix provided by an Internet service provider, from the router device; a second computer program code for causing the computer to generate a network address according to the network prefix and an identifier unique to the communication node; a third computer program code for causing the computer to transmit a packet by attaching the network address as a source address to a header; and a fourth computer program code for causing the computer to change the source address of the packet to another network address generated according to a newly notified network prefix and the identifier unique to the communication node and re-transmit the packet, when a notice that the transfer of the packet was not carried out is received from the router device with respect to the packet transmitted by the third computer program code and a notice of the network prefix of the Internet service provider for which the connectivity is confirmed is received.

According to another aspect of the present invention there is provided a source address selection method in a source address selection system containing a router device connected to a plurality of Internet service providers, and a communication node connected to the router device, the source address selection method comprising: checking connectivities with the Internet service providers, at the router device; receiving a network prefix provided by an Internet service provider for which a connectivity is confirmed, at the router device; notifying the network prefix received, at the router device; receiving the network prefix from the router device, at the communication node; generating a network address according to the network prefix and an identifier unique to the communication node, at the communication node; transmitting a packet by attaching the network address as a source address to a header, at the communication node; checking whether the packet received from the communication node has the source address with the network prefix received from the Internet service provider for which the connectivity is confirmed by the router device or not, at the router device; and transferring the packet to the Internet service provider from which the network prefix is received, when the source address has the network prefix received from the Internet service provider for which the connectivity is confirmed by the router device, at the router device, or notifying that a transfer of the packet was not carried out to the communication node without carrying out the transfer of the packet, when the source address does not have the network prefix received from the Internet service provider for which the connectivity is confirmed by the router device, at the router device.

Other features and advantages of the present invention will become apparent from the following description taken in conjunction with the accompanying drawings.

DETAILED DESCRIPTION OF THE INVENTION

Referring now to FIG. 1 to FIG. 11, one embodiment of the present invention will be described in detail.

Figure 1:
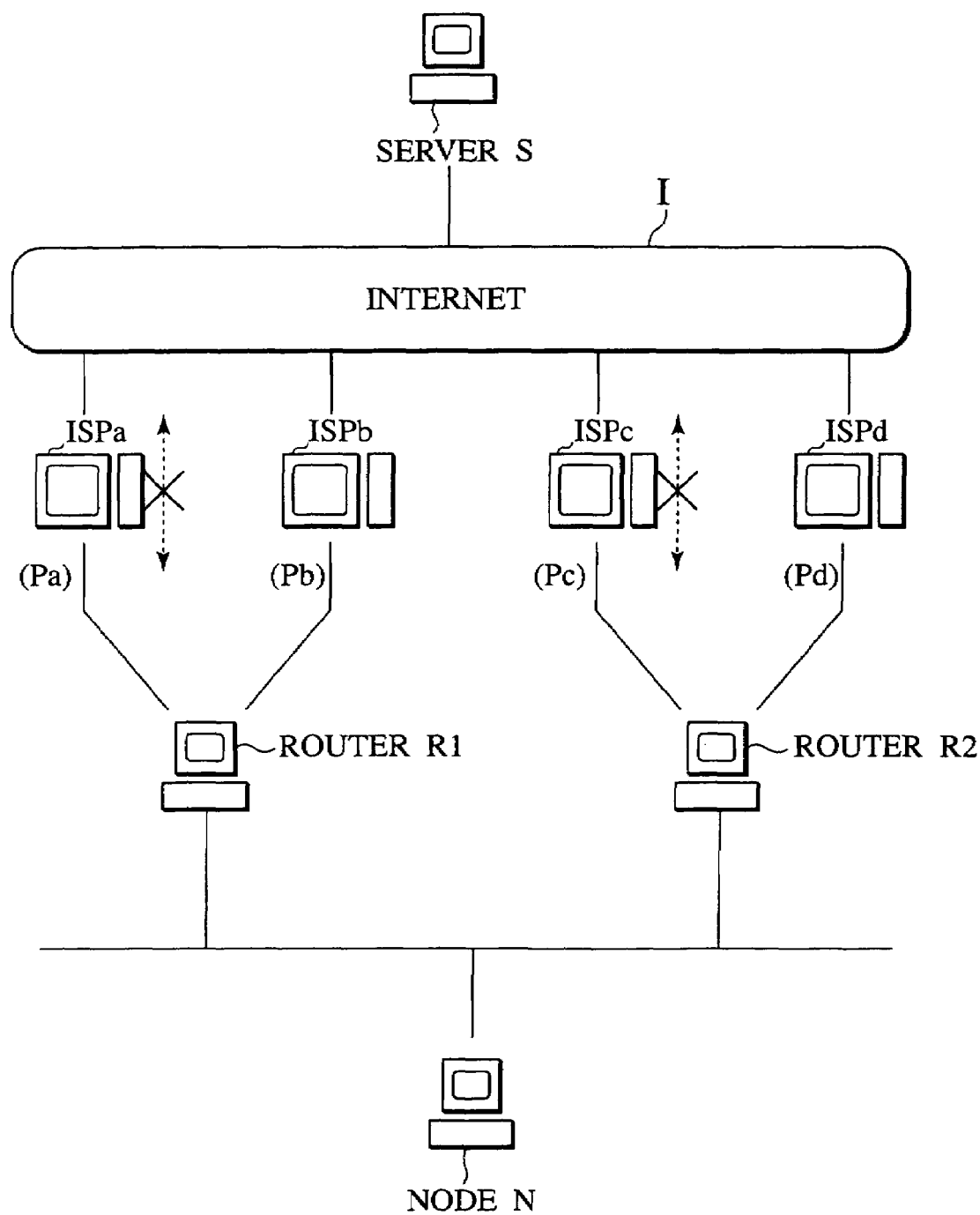
FIG. 1 is a schematic diagram showing an exemplary configuration of a network system according to one embodiment of the present invention.

FIG. 1 shows an exemplary configuration of a network system involving the multi-home environment according to one embodiment of the present invention.

The network system of FIG. 1 has a communication node N having an IPv6 address, which is typically a computer, but it is not necessarily limited to this, and can be anything including a portable telephone terminal, an information home electronics device, etc., as long as it is capable of accessing the Internet through a plurality of Internet service providers.

The network system of FIG. 1 also has the Internet I, and a server S connected to the Internet, which is used as an exemplary correspondent of the communication node N. Of course, the correspondent of the communication node N can be a communication node of a type other than the server.

The network system of FIG. 1 also has routers R1 and R2, which are egress routers to the Internet from a viewpoint of the communication node N. The network system of FIG. 1 also has (networks of) Internet service providers ISPa and ISPb which are connected to the Internet and providing Internet access services to communication nodes, and which are connected to the router R1 side from a viewpoint of the communication node N. The network system of FIG. 1 also has (networks of) Internet service providers ISPc and ISPd which are connected to the Internet and providing Internet access services to communication nodes, and which are connected to the router R2 side from a viewpoint of the communication node N.

In this example, each of the Internet service providers ISPa to ISPd is providing the service for enabling communications with the server S on the Internet, to the communication node N (the Internet service provider will also be referred to as provider or ISP in the following).

Here, the provider ISPa and the router R1 can be connected by a constant connection using a dedicated line or by a dial-up connection. The same remark also applies to the connection between the provider ISPb and the router R1, the connection between the provider ISPc and the router R2, and the connection between the provider ISPd and the router R2.

Note that "Pa" denotes a prefix (network prefix) provided by the provider ISPa, and similarly "Pb", "Pc", and "Pd" denote the prefixes provided by the providers ISPb, ISPc and ISPd, respectively.

Also, assuming that the communication node N is given the respective prefixes from the providers ISPa, ISPb, ISPc and ISPd and the interface ID of the communication node N (an identifier unique to the communication node N) is N, the communication node N has four network addressees (global addresses in this case) including "Pa::N", "Pb::N", "Pc::N", and "Pd::N". Here, it is assumed that the IPv6 address in 128 bits includes the upper 64 bits for the prefix given from the provider and the lower 64 bits for the interface ID. Note that the network address is usually assigned to each interface.

Note that, in the exemplary configuration of FIG. 1, the communication node N can utilize the four ISPs through either one of the two routers, but of course it is possible to use any number of routers to utilize any number of ISPs. It is also possible to utilize any number of ISPs through one router.

Also, in the exemplary configuration of FIG. 1, only one communication node is shown, but other communication nodes may also exist in the same subnet to which the communication node N belongs.

Also, in the exemplary configuration of FIG. 1, only one correspondent of the communication node N is shown, but of course the other correspondents may also exist. Also, the correspondent of the communication node N may be connected to the Internet, directly, or through ISPs different from those used by the communication node N, or through the same ISPs used by the communication node N, or through subnets other than those of the ISPs. Also, the correspondent of the communication node N may or may not be a user of the multi-home to which the present invention is applied.

In the following, the configuration and the operation of the router R1 will be mainly described, but the description regarding the router R1 also applies to the router R2 basically.

Figure 2:
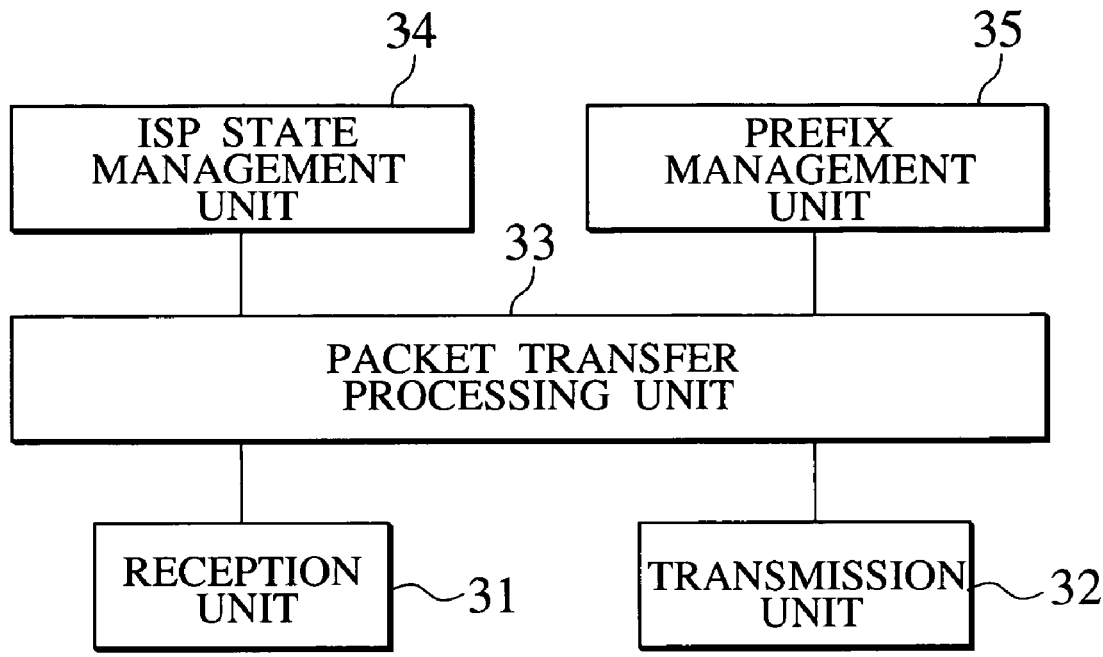
FIG. 2 is a block diagram showing an exemplary configuration of a router according to one embodiment of the present invention.

FIG. 2 shows an exemplary configuration of the router R1 or R2 according to one embodiment of the present invention.

As shown in FIG. 2, the router of this embodiment has a reception unit 31 for receiving packets from (channels connected to) the communication node N side or (channels connected to) the ISP side, a transmission unit 32 for transmitting packets to (channels connected to) the communication node N or (channels connected to) the ISP side, and a packet transfer processing unit 33 for carrying out a processing necessary in transferring packets which is an ordinary role of the router, and a processing such as a judgement as to whether the transfer of the packet from the communication node to the ISP is possible or not according to the connectivity with the ISP, a notification to the communication node N when the packet is not transferred, and a notification of a prefix to be used to the communication node N, which will be described in detail below. The router of this embodiment also has an ISP state management unit 34 for managing a state of a target ISP (checking the connectivity), and a prefix management unit 35 for managing a prefix provided from a target ISP.

Note that the necessary information such as information regarding a state of the ISP (information indicating whether the connectivity is confirmed or not, for example), the assigned prefix, etc., is stored in a suitable memory device. Also, a communication interface for making a connection to the subnet to which the communication node N is connected, and communication interfaces for making connections to channels connected to the ISPs are omitted to be shown in FIG. 2.

Note also that the router R1 can be realized by using a computer, and all or a part of its processing can be realized by a program or a dedicated semiconductor integrated circuit.

Figure 3:
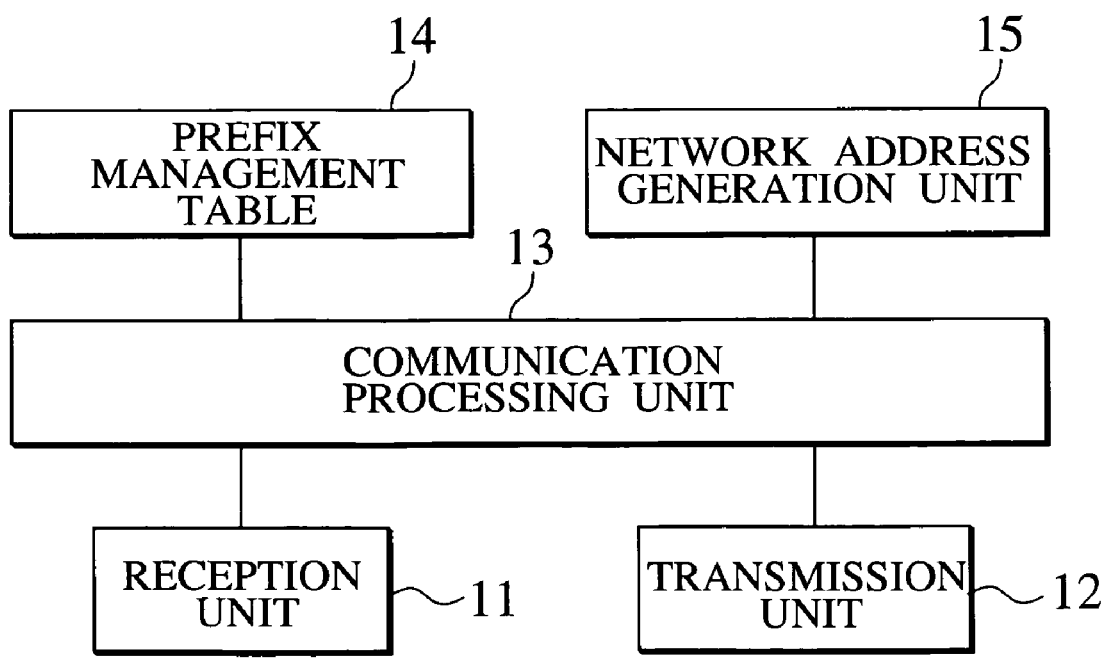
FIG. 3 is a block diagram showing an exemplary configuration of a communication node according to one embodiment of the present invention.

FIG. 3 shows an exemplary configuration of the communication node N according to one embodiment of the present invention.

As shown in FIG. 3, the communication node of this embodiment has a reception unit 11 for receiving packets from the subnet to which the routers R1 and R2 are connected, a transmission unit 12 for transmitting packets to the subnet, and a communication processing unit 13 for carrying out a processing necessary in exchanging packets with a correspondent and a processing such as a selection of the ISP to be used and handling of the notification from the router R1 or R2, etc., which will be described in detail below. The communication node of this embodiment also has a prefix management unit 14 for managing a prefix notified from the router R1 or R2, and a network address generation unit 15 for generating a network address according to the prefix notified from the router R1 or R2 and the interface ID of the communication node itself. Note that the necessary information such as the prefix, the network address, etc., is stored in a suitable memory device. Also, a communication interface is omitted to be shown in FIG. 3.

Note also that all or a part of the processing of this communication node can be realized by a program or a dedicated semiconductor integrated circuit.

In the following, the operation according to this embodiment will be described.

First, the initial stage of the operation will be described.

The router R1 checks the connectivities with the ISPa and ISPb, receives the prefixes provided by the ISPs for which the connectivity is confirmed, and stores and manages the received prefixes, while also notifying all of a part of them to the communication node N (or advertise them within the subnet).

Similarly, the router R2 checks the connectivity with the ISPc and ISPd, receives the prefixes provided by the ISPs for which the connectivity is confirmed, and stores and manages the received prefixes, while also notifying all of a part of them to the communication node N (or advertise them within the subnet).

On the other hand, the communication node N receives the prefix from the router R1 or the router R2, stores the received prefix, generates the network address according to the prefix and the interface ID of the communication node itself, and assigns the network address to a corresponding interface. For example, as in the earlier example, four network addresses "Pa::N", "Pb::N", "Pc::N", and "Pd::N" are generated and assigned (to the interfaces).

After one or more network addresses are generated, the communication node N becomes possible to carry out communications with the server S (provided that the corresponding ISP has the connectivity).

Also, after two or more network addresses are generated and assigned to the same interface, the network address to be used as a source address can be suitably selected for that interface. There are many variations for the selection method such as a method for selecting randomly, a method for selecting according to some order, and a method for selecting one that has a lifetime that expires last when the prefix has a lifetime. There can also be the cases where the priority order is specified according to the attribute (transfer speed, service content, and fee, for example) of the ISP to be used, depending on an entity (application software, for example) that carries out the communications.

Next, the periodical check of the connectivity with each ISP by the router will be described.

The router R1 periodically checks the connectivities with the ISPa and the ISPb, and updates the managed content of the prefix when there is a change in the connectivity. For example, when the connectivity of the ISP for which the connectivity has been confirmed until then cannot be confirmed, the prefix allocated from the ISP for which the connectivity becomes unconfirmed is updated to be unavailable in the management information maintaining the prefix that has been allocated from the ISP for which the connectivity was confirmed, or that prefix is deleted from that management information. Also, when the connectivity of the ISP for which the connectivity has not been confirmed until then can be confirmed, the prefix allocated from the ISP for which the connectivity becomes confirmed is updated to be available in the management information maintaining the prefix that has been allocated from the ISP for which the connectivity was confirmed, or the prefix is received from that ISP and added to that management information.

When there is a change in the connectivity, this fact may be notified to the communication node N (or advertised within the subnet) at that point, or this fact may be notified to the communication node N when a packet from the communication node N is received after that, according to the need (if it is judged to be necessary according to the prefix of the source address of the received packet, for example).

The method by which the router R1 periodically checks the connectivity of each ISP is not limited to any specific method, and it is possible to transmit a vicinity probe packet to a desired communication node through the ISP whose connectivity is to be checked, at a prescribed interval, for example. It is also possible to receive a notification indicating that the connection is normal from the ISP side periodically, or receive a state of the communication path that is further upstream of the connected ISP, for example.

Figure 4:
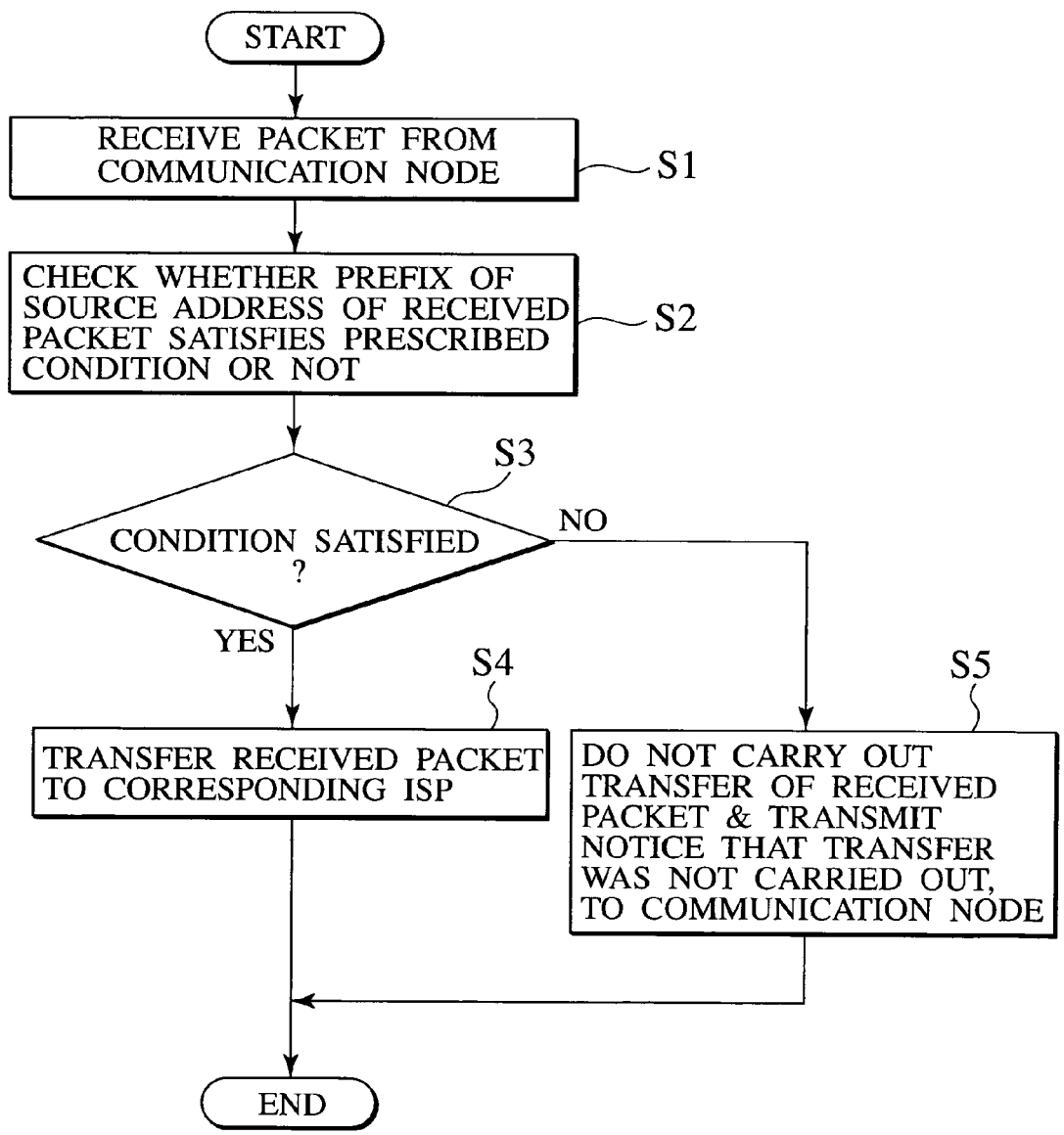
FIG. 4 is a flow chart showing one exemplary processing procedure of the router of FIG. 2.

Next, FIG. 4 shows one exemplary processing procedure in the case where the router R1 receives a packet from the communication node N.

The router R1 receives a packet from the communication node N (step S1), and checks whether the source address (src addr) in a header portion of that packet satisfies a prescribed condition or not (step S2).

Here, the prescribed condition is that the prefix of the source address of the received packet is a prefix provided by the ISP for which the connectivity is confirmed. Namely, when the connectivities of the ISPa and ISPb are confirmed, for example, the router R1 checks whether or not the source address is an address with the prefix that is either a prefix allocated from the ISPa or a prefix allocated from the ISPb to which the router R1 is currently connected. Also, when the connectivity of the ISPa alone is confirmed, for example, the router R1 checks whether or not the source address is an address with the prefix that is a prefix allocated from the ISPa to which the router R1 is currently connected.

When the source address of the received packet from the communication node N is an address with the prefix that is a prefix allocated from the ISP to which the router R1 is currently connected (step S3 YES), the router R1 transfers that received packet to the corresponding ISP (step S4).

On the other hand, when the source address is an address with the prefix that is not a prefix allocated from the ISP to which the router R1 is currently connected (step S3 NO), information (prefix-incorrect) indicating that the transfer of the packet was not carried out (that is, the prefix of that source address cannot be used) is transmitted to the communication node N which transmitted that packet, by using an ICMP (Internet Control Message Protocol), for example (step S5).

Figure 5:
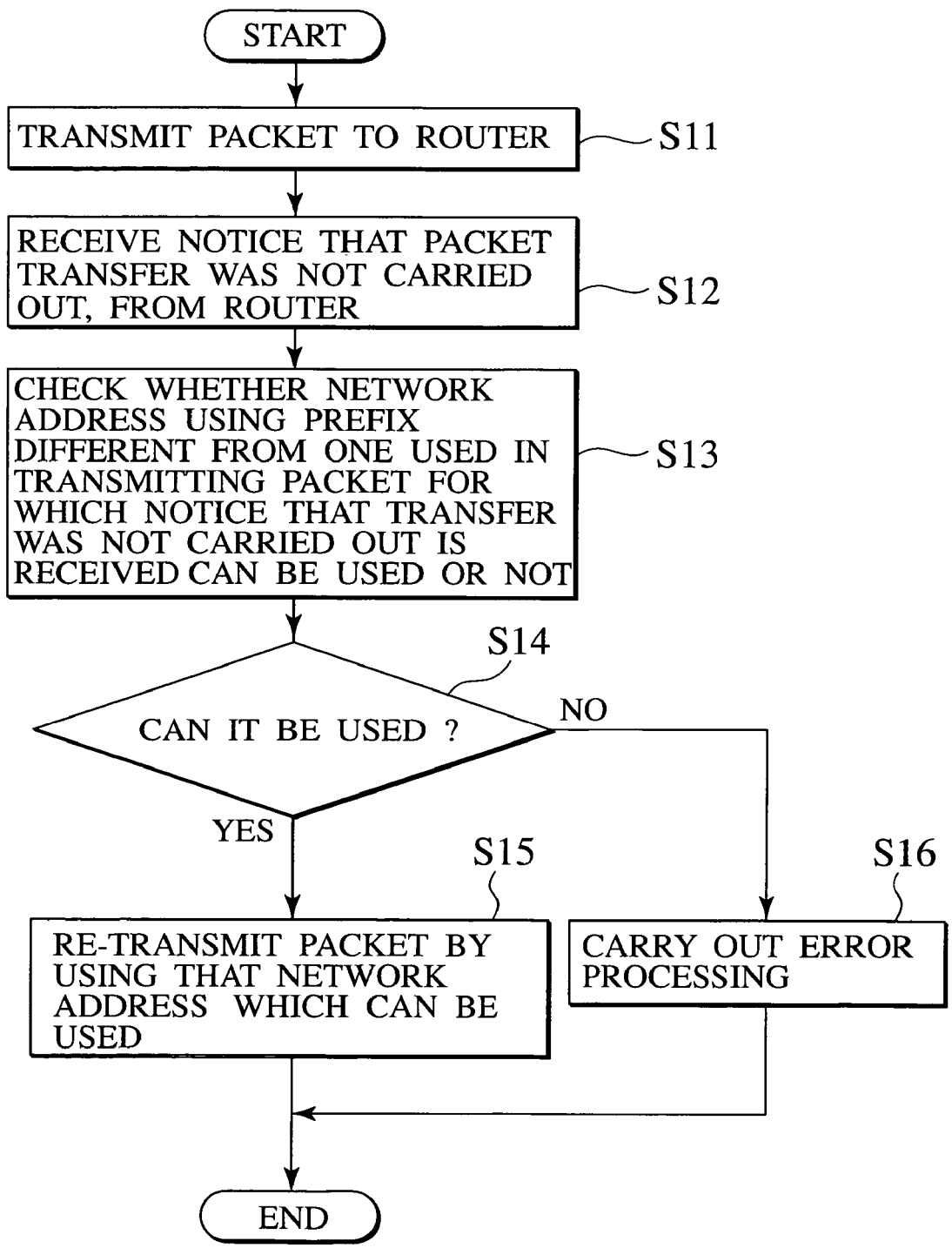
FIG. 5 is a flow chart showing one exemplary processing procedure of the communication node of FIG. 3.

Next, FIG. 5 shows one exemplary processing procedure in the case where the communication node N transmits a packet destined to the server S and this packet is transferred to the router R1 but this packet is not transferred by the router R1.

First, the communication node N transmits a packet destined to the server S (step S11).

Suppose that the prefix of the address selected as the source address at that point is an address related to the ISP whose state became that in which the connectivity is currently not confirmed by the router R1. In this case, as described above, the router R1 transmits a notice message indicating that the transfer of the packet was not carried out.

Then, when the notice indicating that the transfer of the packet was not carried out is received from the router R1 (step S12), the communication node N checks whether the network address with a prefix different from the prefix of the source address used in transmitting that packet for which the notice is received can be used as the source address of the packet destined to the server S or not (step S13).

If it can be used (step S14 YES), that network address which can be used is attached to the header as the source address, and the packet destined to the server S is transmitted again (step S15).

On the other hand, if it cannot be used (the case where the network address with a different prefix does not exist or the case where the network address with a different prefix exists but cannot be used for this communication for some reason) (step S14 NO), the error processing is carried out (step S16). There are many variations for the error processing, such as doing nothing, notifying the failure of the communication to the upper layer (the prefix of that source address cannot be used), going back to the step S13 after a prescribed period of time, etc.

Note that, at the step S13, instead of what is described above, it is also possible to check whether the network address based on the prefix related to an ISP different from the ISP related to the prefix of the source address used in transmitting that packet for which the notice is received can be used as the source address of the packet destined to the server S or not.

Also, at the step S12, when the notice that the transfer of the packet was not carried out is received, it is also possible to proceed immediately to the error processing (such as doing nothing, notifying the failure of the communication to the upper layer (the prefix of that source address cannot be used), notifying the failure of the communication and the prefix used at that time, etc., for example) (thereafter the processing by the upper layer or the handling by the user is carried out, for example).

Figure 6:
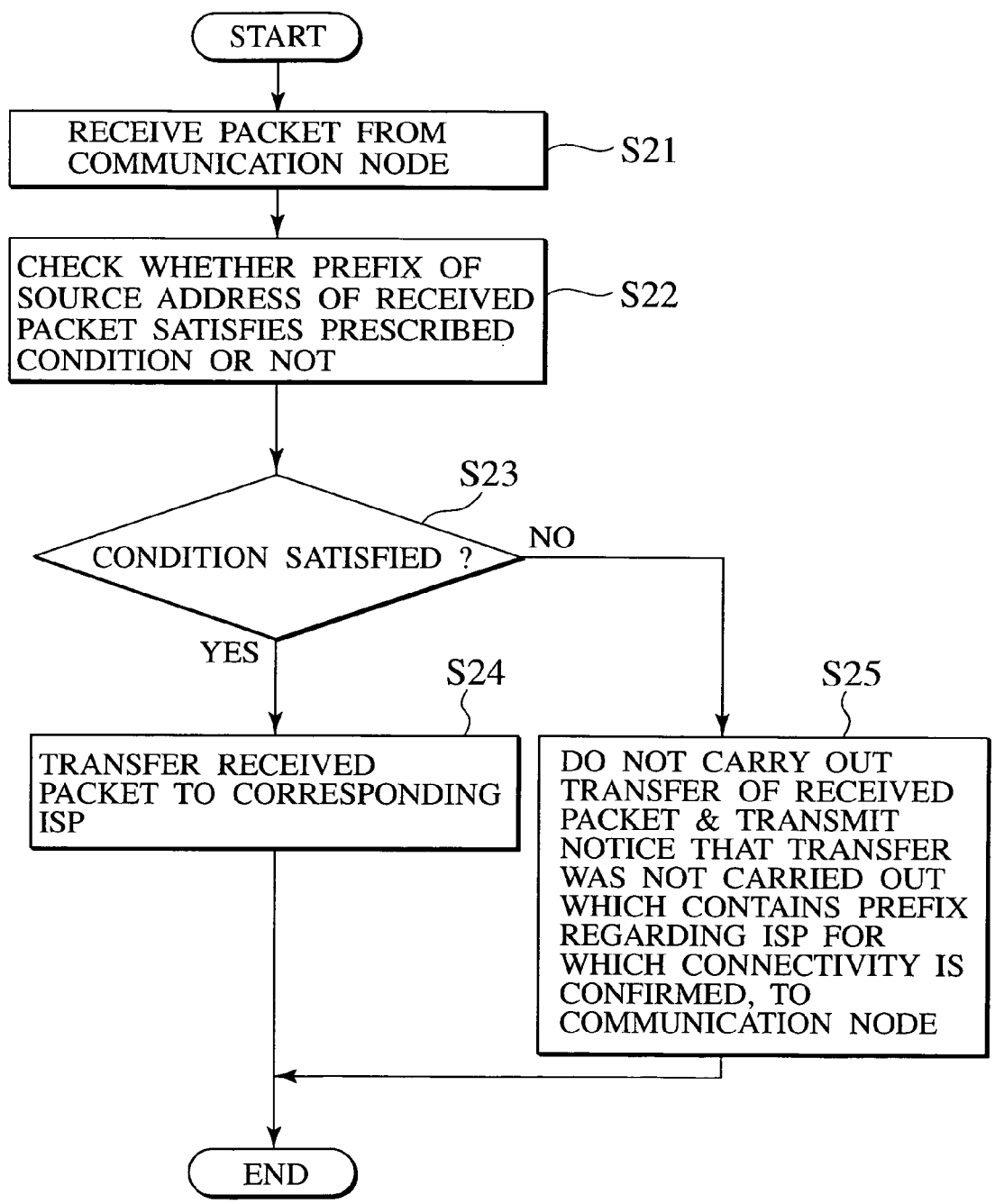
FIG. 6 is a flow chart showing another exemplary processing procedure of the router of FIG. 2.

Next, FIG. 6 shows another exemplary processing procedure in the case where the router R1 receives a packet from the communication node in step S21 and checks conditions as specified in step S22.

In the exemplary procedure of FIG. 4, the router R1 notifies that the transfer of the packet was not carried out to the communication node N when the packet was not transferred because the source address of the received packet does not satisfy the prescribed condition. However, in this exemplary procedure, in such a case, the notice (ICMP message, for example) that also contains the prefix provided from the ISP for which the connectivity is currently confirmed is notified to the communication node N (steps S23 and S25).

For example, when the ISPa is disconnected for some reason, and the connectivity of the ISPb alone is confirmed, if the packet having the source address with the prefix other than the prefix related to the ISPb (the prefix related to the ISPa, for example) is received from the communication node N, the prefix Pb provided from the ISPb alone is notified to the communication node N.

Also, for example, when the connectivities of both the ISPa and ISPb are confirmed, if a packet having a source address based on the prefix other than the prefixes of the ISPa and ISPb is received from the communication node N, the prefix Pa provided from the ISPa and the prefix Pb provided from the ISPb are notified to the communication node N.

Figure 7:
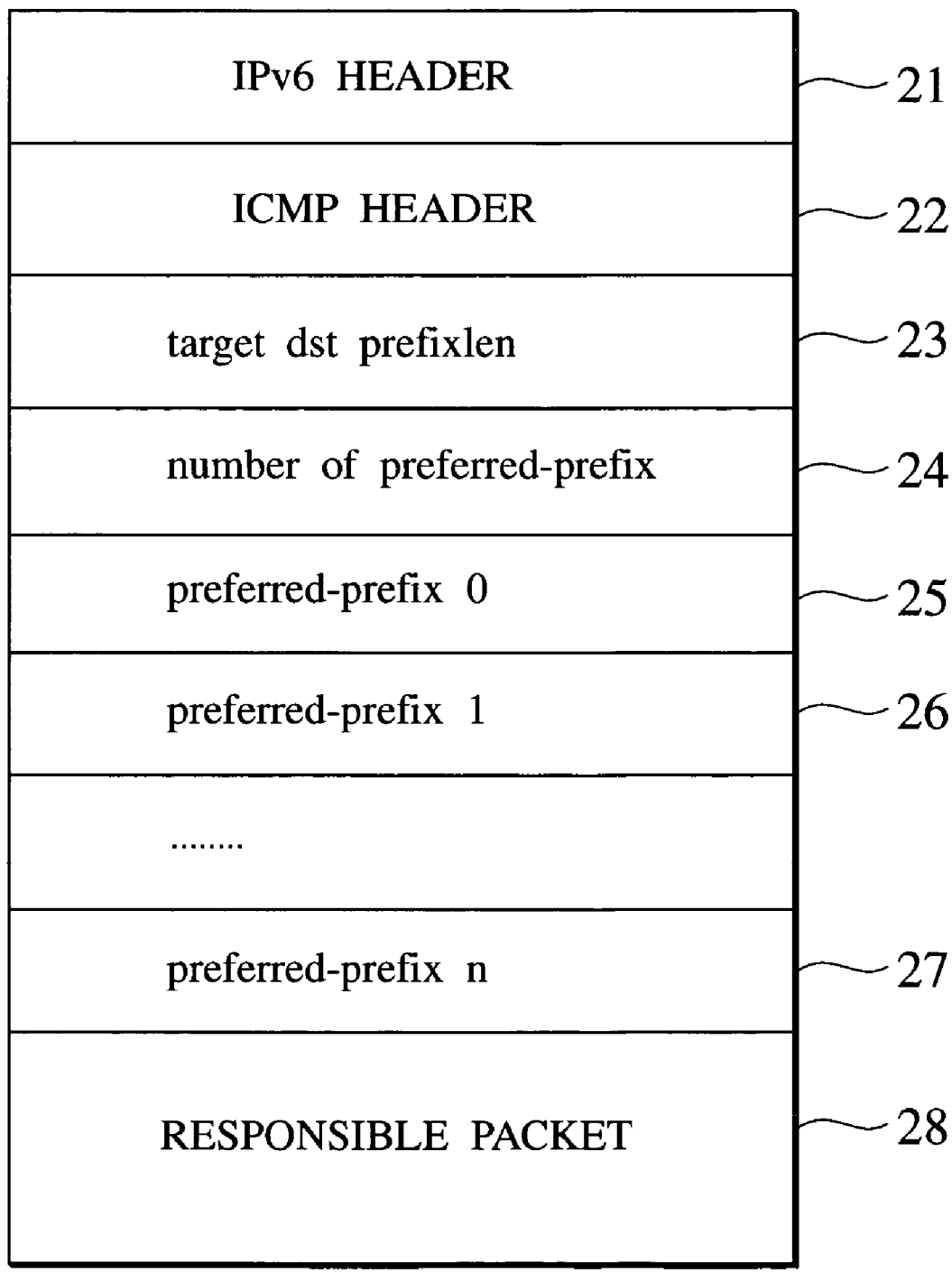
FIG. 7 is a diagram showing an exemplary configuration of an ICMP message according to one embodiment of the present invention.

FIG. 7 shows an exemplary configuration of an ICMP (prefix-incorrect) message in this case.

In FIG. 7, an "IPv6 header" 21 is a header indicating that it is an IPv6 packet, an "ICMP header" 22 is a header indicating that it is an ICMP message, a "target dst prefixlen (target destination prefix length)" 23 is a field indicating an address range in which the "preferred-prefix" contained in this ICMP message becomes a valid destination, a "number of preferred-prefix" 24 is a field indicating the number of "preferred-prefix" contained in this ICMP message, "preferred-prefix" 25 to 27 are fields indicating prefixes which are recommended to be used, and a "responsible packet" 28 is a packet that caused to issue this ICMP message from the router R1.

Here, the "target dst prefixlen" indicates "/128" if it is 128, for example, and implies that the valid address range is specified by the upper 128 bits. Usually, it is valid only for the destination of the responsible packet, but if this value is 64, for example, the packet can be transmitted through the valid ISP by using this "preferred-prefix" only when the prefix in the upper 64 bits coincides. When this value can be obtained by some method, the router R1 enters the obtained appropriate value. Otherwise, the router R1 enters "−1" ("128" is entered when there is an obvious host router").

Figure 8:
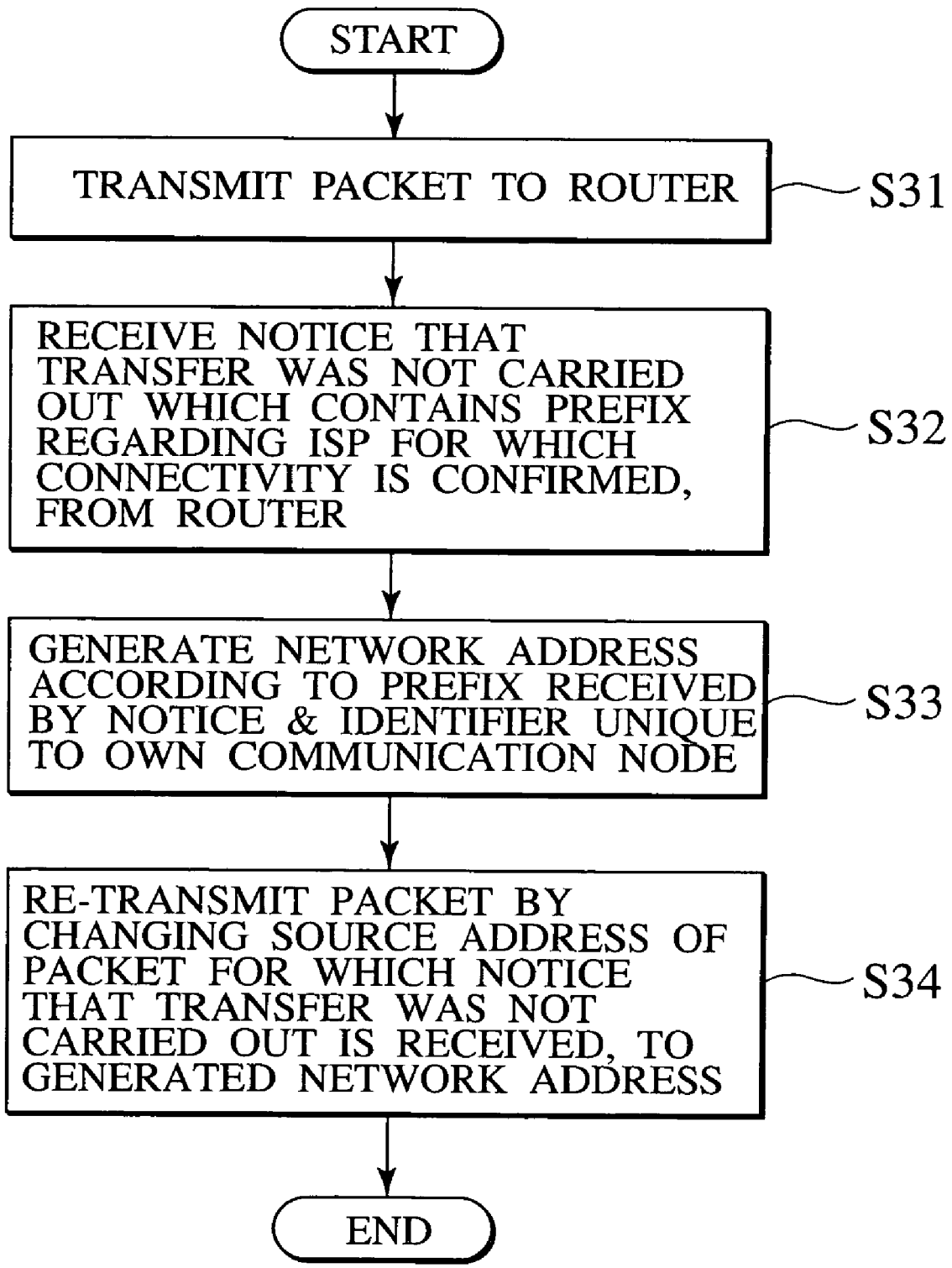
FIG. 8 is a flow chart showing another exemplary processing procedure of the communication node of FIG. 3.

Next, FIG. 8 shows another exemplary processing procedure of the communication node N (an example corresponding to the exemplary procedure of FIG. 6).

First, the communication node N transmits a packet destined to the server S (step S31).

Suppose that the prefix of the address selected as the source address at that point is an address related to the ISP whose state became that in which the connectivity is currently not confirmed by the router R1. In this case, the router R1 transmits a notice message indicating that the transfer of the packet was not carried out and including a notification of the prefix provided from the ISP for which the connectivity is currently confirmed.

Then, the communication node N receives the notice indicating that the transfer of the packet was not carried out and including a notification of the prefix provided from the ISP for which the connectivity is currently confirmed, from the router R1 (step S32).

In this case, the communication node N generates the network address according to the prefix received by that notice and the interface ID of the communication node N itself, according to the need (step S33), changes the source address of the packet for which the notice was received to this generated address (attaches the generated address to the header as the source address), and transmits the packet again (step S34).

Note that, when the corresponding address is already generated and assigned to the interface, the step S33 may be skipped.

Also, when a plurality of prefixes are notified, it is possible to generate a plurality of network addresses, and in this case, the network address to be used as the source address can be suitably selected by the selection method described above.

Also, there can be cases where the network address based on the notified prefix cannot be used as the source address depending on an entity that carries out the communication such as application software.

Now, there are many variations regarding what packet transfer control should be carried out or how the "preferred-prefix" should be notified.

For example, even when the router R1 knows in advance that the bandwidth of the channel on the ISPa side is wide and the setting to use the ISPa side as a default is made, if the prefix Pb of the ISPb side is used in the source address of the packet received from the communication node N side, it is possible to give a higher priority to this indication and carry out the control such that this packet is transferred to the ISPb side.

Also, for example, when the bandwidth of the channel on the ISPa side is considerably wider and if the packet received from the communication node N has the source address using the prefix on the ISPb side, it is possible to notify a message such as ICMP (prefix-incorrect) to the communication node N (even if the connectivity of the ISPb has been confirmed) and at the same time notify that the prefix of the ISPa should be used. In this way, even though the communication node N used the ISPb in the initially transmitted packet, it becomes possible to carry out communications through the ISPa with the wider bandwidth upon receiving the notice of the prefix on the ISPa side from the router R1.

Also, for example, the router R1 may carry out the control such that a response to re-direct to the router R2 is returned instead of notifying the prefixes related to the ISPa and the ISPb to which the communication node itself is to be connected.

Now, in the following, the exemplary operation of the router R1 will be described with references to the exemplary sequences of FIGS. 9A, 9B, 9C and 10.

First, consider the case where connectivity of the ISPa is already confirmed when the router R1 receives a packet from the communication node N.

Figure 9A:
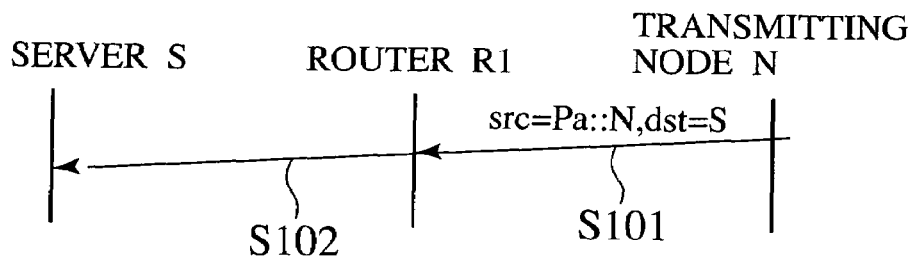
FIGS. 9A, 9B and 9C are sequence charts showing exemplary operation sequences for the network system of FIG. 1.

In this case, suppose that the communication node N transmitted a packet with the source address="Pa::N" and the destination address="S" (src=Pa::N, dst=S) toward the router R1, as shown in FIG. 9A (step S101). Here, if the ISPa is determined in advance as an ISP to be given a higher priority at the router R1, the router R1 in this case transfers the packet received from the communication node N to the ISPa (step S102).

Next, consider the case where the connectivity of the ISPa is lost when the router R1 receives a packet from the communication node N.

Figure 9B:
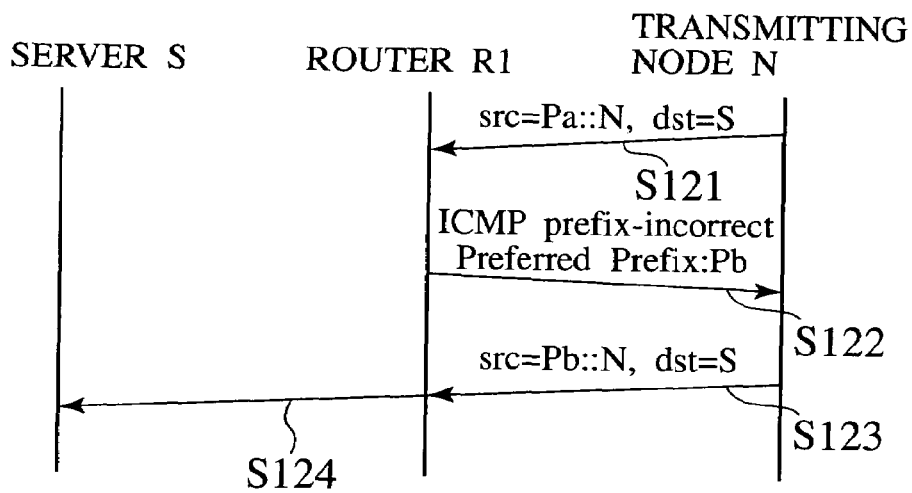

In this case, suppose that the communication node N transmitted a packet with the source address="Pa::N" and the destination address="S" (src=Pa::N, dst=S) toward the router R1, as shown in FIG. 9B (step S121).

Here, it is assumed that the router R1 transmits an ICMP message (see FIG. 7), because the ingress filter is most likely introduced so that it is known in advance that the transfer of this packet will be rejected at the ISPb even if the received packet is transferred to the other ISPb for which the connectivity is maintained (step S122). This ICMP message contains "prefix-incorrect" and "preferred prefix: Pb".

Upon receiving this notice, when the communication node N transmits a packet with the source address="Pb::N" and the destination address="S" (src=Pb::N, dst=S) (step S123), the router R1 in this case transfers the packet received from the communication node N to the ISPb (step S124).

Figure 9C:
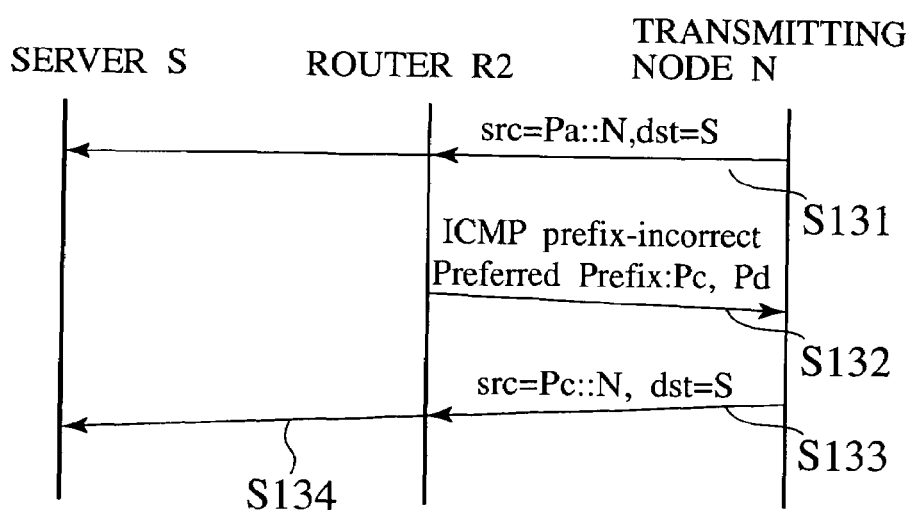

Next, consider the case where the communication node N transmitted a packet with the source address "Pa::N" and the destination address "S" (src=Pa::N, dst=S) toward the router R2, as shown in FIG. 9C (step S131).

In this case, the router R2 basically carries out the same operation as the router R1 described above.

Namely, the router R2 that received the above described packet from the communication node N checks whether or not the prefix Pa given to the source address of the received packet is a prefix notified from the ISP to which the router R2 is connected.

This prefix Pa is not a prefix notified from the ISP to which the router R2 is connected, so that the router R2 transmits the ICMP message toward the communication node N (step S132). This ICMP message contains the "prefix-incorrect" and the "preferred prefix: Pc, Pd" recommended by the router R2 (provided that the connectivities of the ISPc and the ISPd are both confirmed). Here, it is assumed that the connectivities of the ISPc and the ISPd are checked in advance.

Upon receiving this notice, the communication node N transmits a packet with the source address="Pc::N" and the destination address="S" (src=Pc::N, dst=S), for example, toward the router R2 (step S133), and the router R2 transfers the packet received from the communication node N to the ISPc (step S134).

Next, suppose that the connectivities of both the ISPa and the ISPb are lost. In this case, the router R1 has no connectivity to the Internet.

Figures 10, 11:
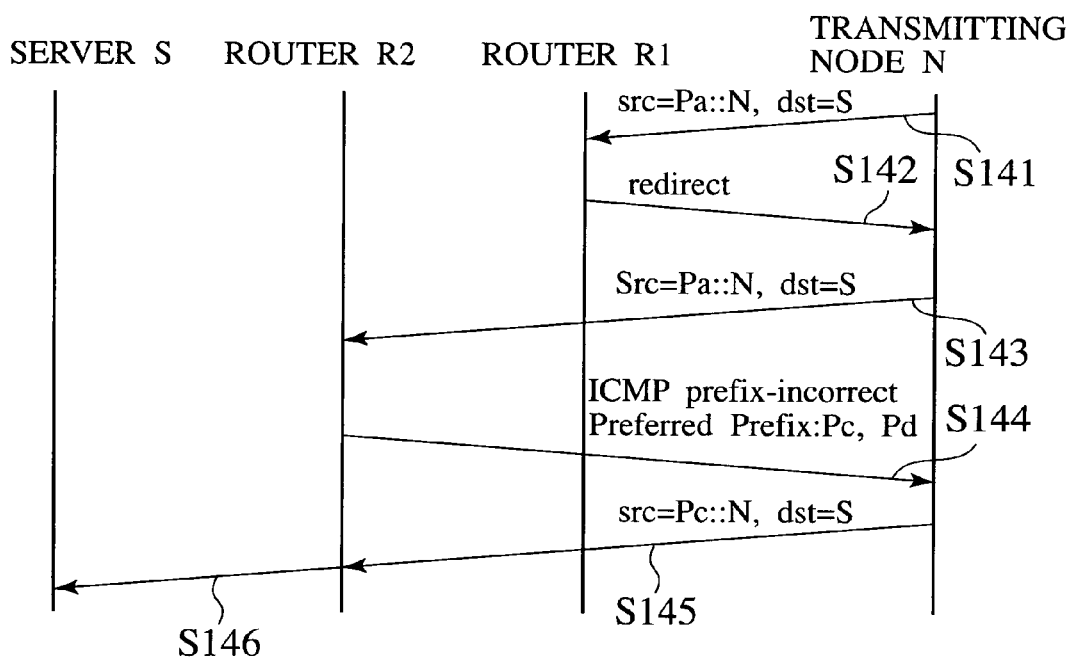
FIG. 10 is a sequence chart showing another exemplary operation sequence for the network system of FIG. 1.
FIG. 11 is a diagram showing an exemplary configuration of a prefix management table according to one embodiment of the present invention.
Figure 12:
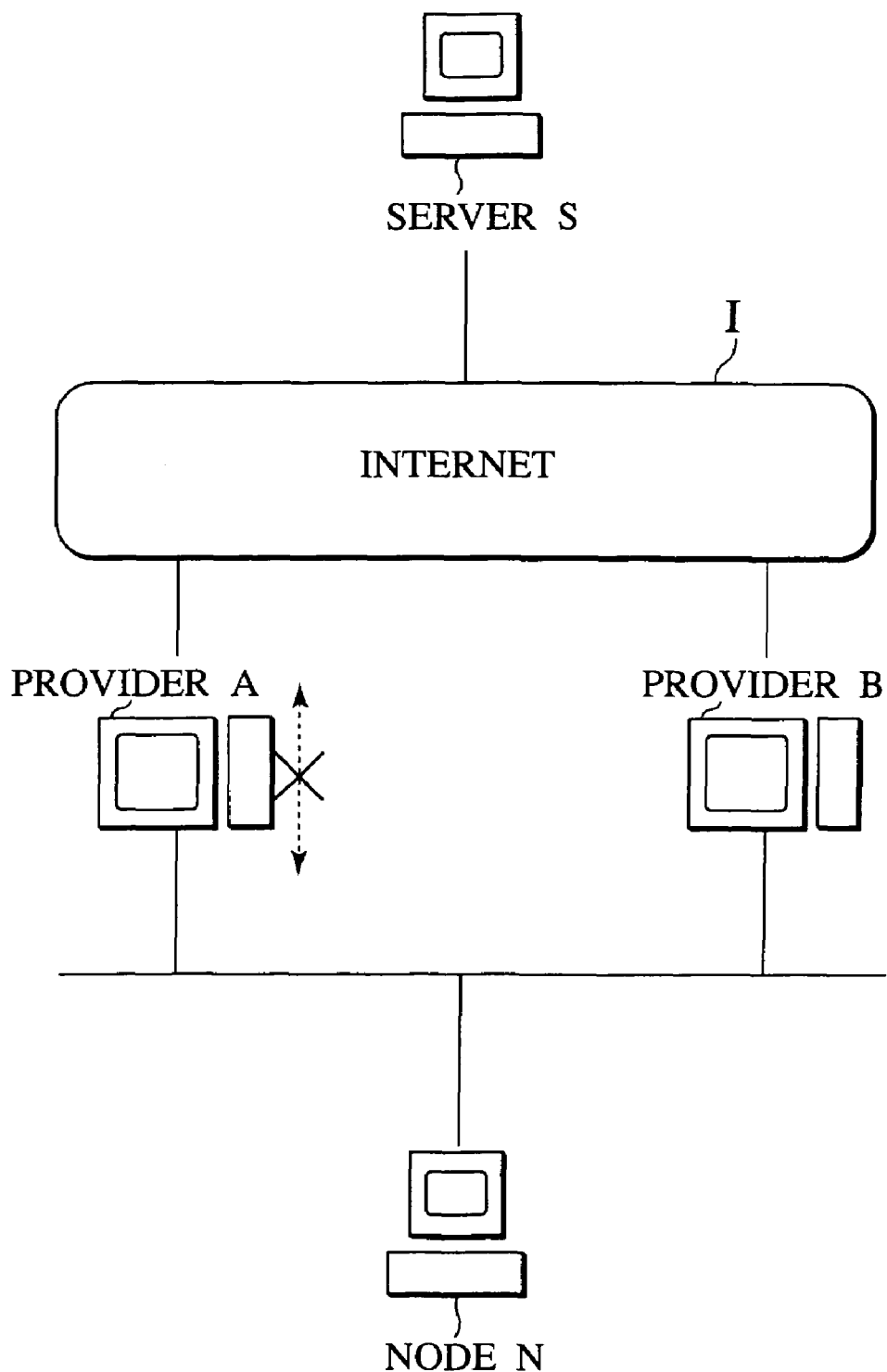
FIG. 12 is a schematic diagram showing a conventional network system in a multi-home environment.

Here, as shown in FIG. 10, suppose that the communication node N transmitted a packet with the source address="Pa::N" and the destination address="S" (src=Pa::N, dst=S), for example, toward the router R1 (step S141).

In this case, the router R1 has the connectivities of the ISPa and the ISPb lost, so that the router R1 can transmit a re-direct message as the ICMP message to the communication node N so as to command the communication node N to select the router R2 as a packet transmission target (step S142).

Here it is assumed that the router R1 knows (or can know) that the router R2 exists as another router that can be a re-direct target (through the information exchange between routers, for example).

According to this ICMP message, the communication node N first transmits a packet with the source address="Pa::N" and the destination address="S" (src=Pa::N, dst=S) toward the router R2 (step S143).

Here, because it is the prefix of the ISP to which the router R2 itself is not connected, the router R2 transmits the ICMP message containing the "prefix-incorrect" and the "preferred prefix: Pc, Pd" recommended by the router R2 (provided that the connectivities of both the ISPc and the ISPd are confirmed) (step S144).

Upon receiving this notice, the communication node N selects Pc and transmits a packet with the source address="Pc::N" and the destination address="S" (src=Pc::N, dst=S), for example, toward the router R2 (step S145), and the router R2 transfers the packet received from the communication node N to the ISPc (step S146).

Note that when the connectivities of both the ISPa and the ISPb are lost and there are a plurality of routers that can be the re-direct target, the router R1 can return one router that is suitably selected from them to the communication node N.

Also, when the connectivities of both the ISPa and the ISPb are lost and there is no router that can be the re-direct target to begin with, or it is known that the routers that can be the re-direct target are all down, it is preferable to return an error to the communication node N.

Next, the exemplary operation of the communication node N will be described with references to FIGS. 9A to 9C and FIG. 10.

First, the case where the communication node N receives the ICMP message as described above will be described.

The communication node N transmits a packet with the source address="Pa::N" and the destination address="S" (src=Pa::N, dst=S) toward the router R1 (step S121 of FIG. 9B).

Here, it is assumed that the prefix used for the source address is notified in advance from the router R1 which is a default router, for example.

Next, suppose that the connectivity of the ISPa specified by the packet received as described above is lost. In this case, the ICMP message as shown in FIG. 7 comes from the router R1, This ICMP message contains the "prefix-incorrect" and the "preferred prefix: Pb" (step S122 of FIG. 9B).

Upon receiving this ICMP message, the communication node N judges the transmission of which packet is this message about, according to the responsible packet 28 shown in FIG. 7.

Next, suppose that this message is transmitted again by rewriting the source address of the packet that earlier became responsible because of the "preferred prefix" (which is Pb here) contained that message.

At that point, if the network address "Pb::N" according to a combination of the prefix (Pb) received as the "preferred prefix" and the interface ID possessed by the communication node N is not provided in advance, this address is generated and used.

It is also possible to control such that the packet is re-transmitted after the responsible packet is checked to see if there is currently a connection corresponding to it or not.

When there is a connection that is related to the responsible packet, whether it is before being established or not, that is whether it is in a process of call origination or not, is checked. For example, whether it is in a state of SYN_SENT on the TCP or not is checked.

In the case where it is originating a call, the connection is set up again by the source address to which the prefix received by the earlier ICMP message is assigned as the source address of that connection. However, when the application specifies the source address explicitly, it is also possible carry out the control that does not carry out the re-setting. The exemplary case of such is when bind ( ) is called before connect ( ) is called and the source address is explicitly specified there, in the case where a socket in general is used.

In addition, it is also possible to store the ICMP message received from the router R1 or R2 as a prefix management table as shown in FIG. 11. Here, when the ICMP message is received, its result is stored as a set of the destination address or its address range and the "preferred-prefix".

As an example, the case where the packet is transmitted to "S::a" and the ICMP message indicating "prefix-incorrect" is received from the router R1 in response will be described.

In this ICMP message, the "preferred-prefix" is described as "Pa". By storing this result as a set of the address or the address range and the prefix, the packet will be transferred by changing the source address to the recommended prefix "Pa::a" by referring to this table at a time of transmitting the packet destined to "S::a" next time.

It is also possible to control such that "Pa" is used at a higher priority by referring to this table when the address has the prefix of "S::/64". In this way. it becomes possible to use the prefix that is recommended in advance at a higher priority, so that it becomes possible to reduce a number of times for receiving the ICMP message from the router. In addition, the storing of this table may be abandoned if the default router is changed or the rules of the packet transmission target at the communication node N are changed.

Next, the case where the communication node N transmits a packet with the source address="Pa::N" and the destination address="S" (src=Pa::N, dst=S) toward the router R2 will be described (step S131 of FIG. 10). This packet is assumed to be a packet for the TCP connection set up, for example.

The router R2 that received this packet ascertains that this prefix "Pa" is not allocated from the ISP on the upstream side of the router R2, by detecting the prefix "Pa" contained in the source address of this packet.

In this way, the router R2 transmits the ICMP message (prefix-incorrect) to the communication node N that transmitted this packet (step S132 of FIG. 10). This ICMP message contains the "preferred-prefix: Pc and Pd" that are the prefixes recommended by the router R2.

Upon receiving this ICMP message, the communication node N first compares the received "preferred-prefix" with the address set in the communication node N itself (in the interface N which is an interface of the communication node N). The communication node N also has addresses having Pc and Pd as prefixes, so that it selects either one as the source address. Here, it is assumed that Pc is selected so that the source address is set to be "Pc::N".

Next, the responsible packet in the ICMP message is checked. At this point, what kind of request to which connection target it is can be ascertained by checking a set of the source address (src addr), the destination address (dst addr), the source port (src port), and the destination port (dst port) of the responsible packet. Next, whether this request is before being established or not, that is whether it is in the process of call origination or not, is checked as mentioned above. After that, it is before being established, the packet is re-transmitted by changing the source address to "Pc::N".

In the following, a method for managing the prefix notified by the ICMP message or the like from the router at the communication node N will be described.

There are many variations regarding how long the prefix notified by the ICMP message or the like from the router should be used, or when it should be discarded.

Note that if the prefix management table is a cache, basically no problem will be caused for the communications no matter when it is discarded. Some of these variations are as follows.

(1) The notified prefix is used only for the re-transmission of the packet at that time, and then discarded.

In the case where the communication node with a small memory capacity carries out the communication, it is preferable to adopt this policy. The same procedure will be repeated in the case of setting up a new connection again with respect to the same correspondent.

(2) The notified prefix is maintained until a prescribed event occurs and a whole or a part of it is discarded when the prescribed event occurs, and this processing is carried out regularly.

For example, a size of the table is determined and if the data overflows, data (an entry referred at the last time, for example) are sequentially discarded at that point.

(3) The discarding is not carried out as a regular processing basically, but a whole or a part of the notified prefix is discarded when it becomes a situation where the discarding should be carried out.

The situation where the discarding should be carried out includes:

(3-1) the case where the re-direct is received; and (3-2) the case where the router that has been used until then breaks down (shortly before).

The above described case (3-1) where the re-direct is received will be described.

For example, suppose that the "prefix-incorrect" was received from the router R2 in the past and the prefix: Pd was notified under the circumstance where the communication node N is accessible to the Internet via the router R1 and the router R2. Then, the communication node N stores the fact that the notice indicating that "it is recommended to use the prefix Pd for S" has been received. Now, suppose that it was possible to carry out the communication by using Pd for a while, but at some point, a notice (ICMP re-direct) indicating that "it is recommended to use the router R1 for S" is received. In such a case, Pd is the prefix depending on the router R2 so that at least this prefix is discarded. When the re-direct is suddenly received for the router that has been used until then, there is a high probability that the situation surrounding the routers R1 and R2 has changed largely (all the links beyond the router R2 went down, for example), so that it is also possible to discard all the prefixes.

The above described case (3-2) where the router that has been used until then brokes down (shortly before) will be described.

When the information indicating that "the packet should be transferred to the router R2 for S" is maintained, if it is ascertained that the router R2 has broken down (the IPv6 node regularly carries out the survival check (NUD, RFC 2461, for example) with respect to the router used by that node, so that it can be ascertained by this, for example), the situation is considerably changed so that the maintained prefixes are meaningless and it is possible to discard them all.

This processing of (3) should preferably be carried out when it is not the case of (1) (so that the meaningless increase of the procedure can be avoided).

(4) The lifetime is used.

The communication node N can determine the lifetime (n seconds, for example) of the prefix at a time of registering the prefix into the table or the like (by the communication node N itself, for example), and register the lifetime in correspondent to the prefix. In this case, the prefix is discarded when the lifetime expires.

As described, according to the present invention, it becomes possible to utilize the multi-home environment effectively, by enabling the selection of the source address according to the egress router with respect to the Internet, by accounting for the state of connection with the Internet service provider.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the router and the communication node of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A source address selection system comprising:
a router device connectable to a plurality of Internet service providers, and
a communication node connected to the router device, wherein:
the router device includes:
a storage unit configured to store management information on connectivities with the Internet service providers;
a first checking unit configured to periodically check connectivities of each of the Internet service providers and update the management information according to a result of the check;
a first receiving unit configured to receive a network prefix provided by an Internet service provider for which a connectivity is confirmed by the first checking unit and store the network prefix into the storage unit as a piece of the management information; and
a notification unit configured to notify the communication node of the network prefix received by the first receiving unit;
the communication node includes:
a second receiving unit configured to receive the network prefix from the router device;
a generation unit configured to generate a network address according to the network prefix and an identifier unique to the communication node; and
a transmission unit configured to transmit a packet by attaching the network address as a source address to a header; and
the router device further includes:
a second checking unit configured to search the management information stored in the storage unit for whether or not the packet received from the communication node has the source address of the network prefix received from the Internet service provider indicating that the Internet service provider's connectivity has been currently confirmed; and a control unit configured to control a transferring of the packet from the communication node to the Internet service provider, wherein, when it is determined by the second checking unit that the source address includes a network prefix, provided by the Internet service provider and for which the connectivity has been confirmed, the control unit permits the router to transfer the packet to the Internet service provider based on the determination that the source address includes the network prefix, and wherein, when it is determined by the second checking unit that the source address includes a different network prefix from the network prefix, provided by the Internet service provider and for which the connectivity has been confirmed, the control unit does not permit the router to transfer the packet to the Internet service provider but does permit the router to notify the communication node that the transferring of the packet was not carried out based on the determination that the source address includes the different network prefix.

2. The source address selection system of claim 1, wherein the control unit of the router device has a function to notify that the transfer of the packet was not carried out to the communication node without carrying out the transfer of the packet, and notify the communication node of the network prefix provided by the Internet service provider for which the connectivity is currently confirmed by searching the management information when the source address does not have the network prefix received from the Internet service provider for which the connectivity is currently confirmed by the router device searching the management information.

3. The source address selection system of claim 2, wherein the communication node changes the source address of the packet to another network address generated according to a newly notified network prefix and the identifier unique to the communication node and re-transmits the packet when a notice that the transfer of the packet was not carried out is received from the router device with respect to the packet transmitted by the communication node and a notice of the network prefix of the Internet service provider for which the connectivity is currently confirmed is received.

4. The source address selection system of claim 3, wherein the communication node uses the network address based on the network prefix only for a re-transmission of the packet when the notice that the transfer of the packet was not carried out is received from the router device with respect to the packet transmitted by the communication node and the notice of the network prefix of the Internet service provider for which the connectivity is currently confirmed is received.

5. The source address selection system of claim 3, wherein the communication node uses the network address based on the network prefix until the management information indicates that the network address becomes invalid when the notice that the transfer of the packet was not carried out is received from the router device with respect to the packet transmitted by the communication node and the notice of the network prefix of the Internet service provider for which the connectivity is currently confirmed is received.

6. The source address selection system of claim 1, wherein the control unit of the router device has a function to notify that the transfer of the packet was not carried out to the communication node without carrying out the transfer of the packet, and notify the communication node of another router device that should be used as a transmission target of the packet when the source address does not have the network prefix received from the Internet service provider for which the connectivity is currently confirmed by searching the management information and the management information indicates that the Internet service provider for which the connectivity is confirmed does not exist at that timing.

7. The source address selection system of claim 1, wherein the control unit of the router device has a function to notify that the transfer of the packet was not carried out to the communication node, and notify the communication node of the network prefix provided by the Internet service provider that should be used when the source address has the network prefix received from the Internet service provider for which the connectivity is currently confirmed by searching the management information and a prescribed condition is satisfied.

8. A router device connectable to a plurality of Internet service providers and a local network, for transferring a packet of a communication node connected to the local network, the router device comprising:

a storage unit configured to store management information on connectivities with the Internet service providers;

a first checking unit configured to periodically check the connectivities of each of the Internet service providers and update the management information according to a result of the check;

a receiving unit configured to receive a network prefix provided by an Internet service provider for which a connectivity is confirmed by the first checking unit and store the network prefix into the storage unit as a piece of the management information;

a notification unit configured to notify the local network of the network prefix received by the receiving unit;

a second checking unit configured to search the management information stored in the storage unit for whether or not the packet received from the communication node has a source address of the network prefix received from the Internet service provider indicating that the Internet service provider's connectivity has been currently confirmed; and a control unit configured to:

control a transferring of the packet from the communication node to the Internet service provider, wherein, when it is determined by the second checking unit that the source address includes a network prefix, provided by the Internet service provider and for which the connectivity has been confirmed, the control unit permits the router to transfer the packet to the Internet service provider based on the determination that the source address includes the network prefix, and wherein, when it is determined by the second checking unit that the source address includes a different network prefix from the network prefix, provided by the Internet service provider and for which the connectivity has been confirmed, the control unit does not permit the router to transfer the packet to the Internet service provider but does permit the router to notify the communication node that the transferring of the packet was not carried out based on the determination that the source address includes the different network prefix.

9. The router device of claim 8, wherein the control unit has a function to notify that the transfer of the packet was not carried out to the communication node without carrying out the transfer of the packet, and notify the communication node of the network prefix provided by the Internet service provider for which the connectivity is currently confirmed searching the management information when the source address does not have the network prefix received from the Internet service provider for which the connectivity is currently confirmed by searching the management information.

10. The router device of claim 8, wherein the control unit has a function to notify that the transfer of the packet was not carried out to the communication node without carrying out the transfer of the packet, and notify the communication node of another router device that should be used as a transmission target of the packet when the source address does not have the network prefix received from the Internet service provider for which the connectivity is currently confirmed searching the management information and the management information indicates that the Internet service provider for which the connectivity is confirmed does not exist at that timing.

11. The router device of claim 8, wherein the control unit has a function to notify that the transfer of the packet was not carried out to the communication node, and notify the communication node of the network prefix provided by the Internet service provider that should be used when the source address has the network prefix received from the Internet service provider for which the connectivity is currently confirmed by searching the management information and a prescribed condition is satisfied.

12. A communication node for carrying out communications with a desired correspondent node through a router device connectable to a plurality of Internet service providers, the communication node comprising:
  a receiving unit configured to receive a network prefix provided by an Internet service provider from the router device;
  a storage unit configured to store the network prefix received by the receiving unit;
  a generation unit configured to generate a first network address using the network prefix and an identifier unique to the communication node; and
  a transmission unit configured to transmit a packet having the first network address attached as a source address to a header;
  wherein the communication node generates a second packet having a second network address attached as a source address to a header and transmits the second packet when:
    a notice indicating that the transfer of the first packet was not carried out is received from the router device with respect to the first packet transmitted by the transmission unit, and
    a notice indicating that the newly notified network prefix of the Internet service provider has connectivity currently confirmed by a periodic check with a prescribed interval, is received from the router device,
  wherein the second packet is generated using a newly notified network prefix and the identifier unique to the communication node.

13. The communication node of claim 12, wherein the communication node uses the second network address based on the newly notified network prefix only for a transmission of the second packet when the notice that the transfer of the first packet was not carried out is received from the router device with respect to the first packet transmitted by the communication node and the notice of the newly notified network prefix of the Internet service provider for which the connectivity is currently confirmed is received.

14. The communication node of claim 12, wherein the communication node uses the first network address based on the network prefix until the first network address becomes invalid when the notice that the transfer of the first packet was not carried out is received from the router device with respect to the first packet transmitted by the communication node and the notice of the newly notified network prefix of the Internet service provider for which the connectivity is currently confirmed is received.

15. A source address selection method at a router device connectable to a plurality of Internet service providers and a local network, for transferring a packet of a communication node connected to the local network, the source address selection method comprising:
  periodically checking connectivities with of each of the Internet service providers; receiving a network prefix provided by an Internet service provider for which a connectivity is currently confirmed;
  storing the network prefix into a storage unit as a piece of management information the connectivities with the Internet service providers so as to update the management information stored in the storage unit;
  notifying the local network of the received network prefix;
  searching the management information stored in the storage unit for whether or not the packet received from the communication node has a source address of the network prefix received from the Internet service provider indicating that the Internet service provider's connectivity has been currently confirmed by the router device; and
  transferring the packet from the communication node to the Internet service provider,
    wherein based on a determination by the second checking unit that the source address includes a network prefix, provided by the Internet service provider and for which the connectivity has been confirmed, transferring the packet to the Internet service provider, and
    wherein based on a determination by the second checking unit that the source address includes a different network prefix from the network prefix, provided by the Internet service provider and for which the connectivity has been confirmed, not transferring the packet to the Internet service provider but notifying the communication node that the transferring of the packet was not carried out.

16. A computer readable medium having stored thereon a computer program product, for causing a computer when executing the computer program product to function as a router device connectable to a plurality of Internet service providers and a local network, for transferring a packet of a communication node connected to the local network, the computer program product comprising:
  a first computer program code for causing the computer to periodically check connectivities interval of each of the Internet service providers;
  a second computer program code for causing the computer to receive a network prefix provided by an Internet service provider for which a connectivity is currently confirmed by the first computer program code;
  a third computer program code for causing the computer to store the network prefix into a storage unit as a piece of management information on the connectivities with the Internet service providers so as to update the management information stored in the storage unit;
  a fourth computer program code for causing the computer to notify the local network of the network prefix received by the second computer program code;

a fifth computer program code for causing the computer to search the management information stored in the storage unit for whether the packet received from the communication node has a source address of the network prefix received from the Internet service provider indicating that the Internet service provider's connectivity has been currently confirmed; and a sixth computer program code for causing the computer to transfer the packet from the communication node to the Internet service provider, wherein based on a determination by the second checking unit that the source address includes a network prefix, provided by the Internet service provider and for which the connectivity has been confirmed, the packet is transferred to the Internet service provider, and wherein based on a determination by the second checking unit that the source address includes a different network prefix from the network prefix, provided by the Internet service provider and for which the connectivity has been confirmed, the packet is not transferred to the Internet service provider but the communication node is notified that the transferring of the packet was not carried out.

17. A source address selection method at a communication node for carrying out communications with a desired correspondent node through a router device connectable to a plurality of Internet service providers, the source address selection method comprising:

receiving a network prefix provided by an Internet service provider from the router device;

storing the network prefix received by the receiving step;

generating a first network address using the network prefix and an identifier unique to the communication node;

transmitting a packet having the network address attached as a source address to a header;

receiving, from the router device, a notice indicating that the transfer of the first packet was not carried out;

generating a second packet having a second network address when the notice indicating that the transfer of the first packet was not carried out, wherein the second packet is generated using a newly notified network prefix and wherein the identifier unique to the communication node is attached as a source address to a header of the second packet; and receiving, from the router device, a notice indicating that the newly notified prefix of the internet service has connectivity currently confirmed by a periodic check with a prescribed interval; and transmitting the second packet when the notice indicating that the newly notified network prefix of the Internet service provider has connectivity currently confirmed by a periodic check with a prescribed interval, is received from the router device.

18. A computer readable medium having stored thereon a computer program product, for causing a computer when executing the computer program product to function as a communication node for carrying out communications with a desired correspondent node through a router device connectable to a plurality of Internet service providers, the computer program product comprising:

a first computer program code for causing the computer to receive a network prefix provided by an Internet service provider from the router device;

a second computer program code for causing the computer to store the network prefix received by the first computer program code;

a third computer program code for causing the computer to generate a first network address using the network prefix and an identifier unique to the communication node;

a fourth computer program code for causing the computer to transmit a packet by having the first network address attached as a source address to a header; and a fifth computer program code for causing the computer to generate a second packet having a second network address, wherein the second packet is generated using a newly notified network prefix and the identifier unique to the communication node, and wherein the fifth computer program code further causes the computer to transmit the second packet when a notice indicating that the transfer of the first packet was not carried out is received from the router device with respect to the first packet transmitted by the third computer program code and when a notice indicating that the newly notified network prefix of the Internet service provider has connectivity currently confirmed by a periodic check with a prescribed interval, is received.

19. A source address selection method in a source address selection system containing a router device connectable to a plurality of Internet service providers, and a communication node connected to the router device, the source address selection method comprising:

periodically checking connectivities with of each of the Internet service providers, at the router device;

receiving a network prefix provided by an Internet service provider for which a connectivity is currently confirmed, at the router device;

storing the network prefix into a storage unit as a piece of management information on the connectivities of the Internet service providers so as to update the management information stored in the storage unit, at the router device;

notifying the communication node of the received network prefix, at the router device;

receiving the network prefix from the router device, at the communication node;

generating a network address using the network prefix and an identifier unique to the communication node, at the communication node;

transmitting a packet having the network address attached as a source address to a header, at the communication node;

searching the management information stored in the storage unit for whether or not the packet received from the communication node has the source address of the network prefix received from the Internet service provider indicating that the Internet service provider's connectivity has been currently confirmed, at the router device; and transferring the packet from the communication node to the Internet service provider, wherein, when it is determined by the second checking unit that the source address includes a network prefix, provided by the Internet service provider and for which the connectivity has been confirmed, transferring the packet to the Internet service provider based on the determination that the source address includes the network prefix, and wherein, when it is determined by the second checking unit that the source address includes a different network prefix from the network prefix, provided by the Internet service provider and for which the connectivity has been confirmed, not transferring the packet to the Internet service provider but notifying the communication node that the transferring of the packet was not carried out based on the determination that the source address includes the different network prefix.

* * * * *